United States Patent
Huang

(10) Patent No.: US 8,457,183 B2
(45) Date of Patent: Jun. 4, 2013

(54) APPARATUS WITH TUNABLE FILTER AND RELATED ADJUSTING METHOD

(75) Inventor: Ming-Chung Huang, Taichung (TW)

(73) Assignee: Realtek Semiconductor Corp., Hsinchu (TW)

( * ) Notice: Subject to any disclaimer, the term of this patent is extended or adjusted under 35 U.S.C. 154(b) by 942 days.

(21) Appl. No.: 12/402,482

(22) Filed: Mar. 11, 2009

(65) Prior Publication Data

US 2009/0232251 A1 Sep. 17, 2009

(30) Foreign Application Priority Data

Mar. 13, 2008 (TW) .............................. 97108852 A

(51) Int. Cl.
*H04B 3/46* (2006.01)
(52) U.S. Cl.
USPC ........... 375/224; 375/219; 375/225; 375/226; 375/227; 375/228; 455/67.11; 455/67.13; 455/67.14; 455/67.16; 455/226.1
(58) Field of Classification Search
CPC ........ H04B 17/00; H04B 3/56; H04B 17/0005; H04B 17/015; H04B 17/004; H04B 17/0062; H04B 17/008
USPC ........... 375/224–229, 219; 455/67.11, 67.13, 455/67.14, 67.16, 69, 115.1, 226.1, 307
See application file for complete search history.

(56) References Cited

U.S. PATENT DOCUMENTS

| | | | | |
|---|---|---|---|---|
| 5,796,814 | A * | 8/1998 | Brajal et al. | 375/232 |
| 7,161,416 | B2 * | 1/2007 | Gangi | 327/552 |
| 7,212,789 | B2 | 5/2007 | Kuffner | |
| 7,317,774 | B2 * | 1/2008 | Richey et al. | 375/355 |
| 7,346,313 | B2 * | 3/2008 | Cafarella | 455/67.11 |
| 7,385,913 | B2 * | 6/2008 | Sobchak et al. | 370/203 |
| 7,437,139 | B2 * | 10/2008 | Lo et al. | 455/340 |
| 2003/0072320 | A1 * | 4/2003 | Seo et al. | 370/441 |
| 2006/0001559 | A1 | 1/2006 | Tuttle | |
| 2008/0025439 | A1 * | 1/2008 | Al-Eidan | 375/334 |

* cited by examiner

*Primary Examiner* — Sophia Vlahos
(74) *Attorney, Agent, or Firm* — McClure, Qualey & Rodack, LLP

(57) ABSTRACT

The present invention discloses a method for adjusting a tunable compensation filter within a communication device. The method includes the following steps: generating at least a detecting signal according to at least a pole of the tunable compensation filter; generating a transmitted signal according to the detecting signal; receiving the transmitted signal via a loop switch; generating a filtered signal by filtering the transmitted signal; generating a received signal by compensating the filtered signal; generating at least an indicating signal by comparing the detecting signal with the received signal; and determining whether to adjust at least a coefficient of the tunable compensation filter or not according to the indicating signal.

14 Claims, 10 Drawing Sheets

APPARATUS WITH TUNABLE FILTER AND RELATED ADJUSTING METHOD

BACKGROUND OF THE INVENTION

1. Field of the Invention

The present invention relates to communication systems, and more particularly, to a communication apparatus for calibrating a tunable compensation filter and method thereof.

2. Description of the Prior Art

Continuing developments of communication technologies have given rise to many communication specifications. One of the most important issues of communication technologies is to develop a solution that supports different communication specifications simultaneously. For instance, Software Defined Radio (SDR) technology supports different communication specifications. A hardware device of the SDR technology is applied to different communication channels and various signal modulations.

Utilizing conventional SDR technology, users can conveniently switch among various communication specifications (e.g., specifications of GSM system and/or Bluetooth, etc.) by using one hardware device (e.g., a mobile phone).

However, because the development of the SDR technology emphasizes both flexible hardware and software a platform, designing an excellent SDR scheme has inherent difficulties.

Usually, there are a tunable filter (e.g., a low pass filter) and a compensation filter for compensating the tunable low pass filter in a conventional SDR communication system, and a 3-dB cut-off frequency of the tunable filter is changeable; in most cases the tunable filter is a sin c like filter. A sin c function is expressed as:

$$\sin c(x) = \sin(x)/x.$$

Please refer to FIG. 1. FIG. 1 is a diagram illustrating frequency responses of a conventional SDR filter. As shown in FIG. 1, a pass band response of the conventional SDR filter is not flat but has a gain drop. The compensation filter is therefore used for compensating the un-ideal frequency response to obtain a wanted flat gain curve of the pass band. Please refer to FIG. 2. FIG. 2 is a diagram illustrating a total frequency response of combining a sin c filter and a 1/sin c filter. The 1/sin c function filter is used as a compensation filter of the sin c filter. As shown in FIG. 2, the compensation filter can be implemented by an ideal 1/sin c filter. Therefore, the required response for the SDR communication device is obtained by multiplying the frequency response of sin c filter with the frequency response of 1/sin c filter, that is, the total frequency response of the two filters will be flat.

Usually, there are a tunable filter (e.g., a low pass filter) and a compensation filter for compensating the tunable low pass filter in a conventional SDR communication system, and a 3-dB cut-off frequency of the tunable filter is changeable; in most cases the tunable filter is a sin c like filter. A sin c function is expressed as:

$$\sin c(x) = \sin(x)/x.$$

Please refer to FIG. 1. FIG. 1 is a diagram illustrating frequency responses of a conventional SDR filter. As shown in FIG. 1, a pass band response of the conventional SDR filter is not flat but has a gain drop. The compensation filter is therefore used for compensating the un-ideal frequency response to obtain a wanted flat gain curve of the pass band. Please refer to FIG. 2. FIG. 2 is a diagram illustrating a total frequency response of combining a sin c filter and a 1/sin c filter. The 1/sin c function filter is used as a compensation filter of the sin c filter. As shown in FIG. 2, the compensation filter can be implemented by an ideal 1/sin c filter. Therefore, the required response for the SDR communication device is obtained by multiplying the frequency response of sin c filter with the frequency response of 1/sin c filter, that is, the total frequency response of the two filters will be flat.

Unfortunately, in real cases the frequency response of the SDR filter is not an ideal sin c function, and the ambient temperature and process deviations also affect the frequency of the sin c filter. Conventionally, the coefficient of the compensation filter is inflexible and thereby fails to compensate the SDR filter successfully even if the frequency response of the SDR filter varies.

In actual circuit design the operation for predicting the frequency response of the SDR filter is both difficult and imprecise. Using the fixed compensation filter (e.g., using a 1/sin c filter) fails to compensate the SDR filter to make the communication device have a pass-band signal which has a flat gain response/gain curve; this leads to a bad signal processing performance at the receiver end.

According to an embodiment of the present invention, a method for adjusting a tunable compensation filter within a communication device is disclosed. The adjusting method includes the following steps: generating at least a detecting signal according to at least a pole of the tunable compensation filter; generating a transmitted signal according to the detecting signal; receiving the transmitted signal via a loop switch; generating a filtered signal by filtering the transmitted signal; generating a received signal by compensating the filtered signal; generating at least an indicating signal by comparing the detecting signal with the received signal; and determining whether or not to adjust at least a coefficient of the tunable compensation filter according to the indicating signal.

These and other objectives of the present invention will no doubt become obvious to those of ordinary skill in the art after reading the following detailed description of the preferred embodiment that is illustrated in the various figures and drawings.

DETAILED DESCRIPTION

As mentioned above, an objective of the present invention is to provide a tunable compensation filter within a communication device, wherein coefficient(s) of the tunable compensation filter is adjustable when a frequency response of the SDR filter varies with a status of the communication device, to hence improve the whole frequency response of the SDR communication device.

Figure 1:
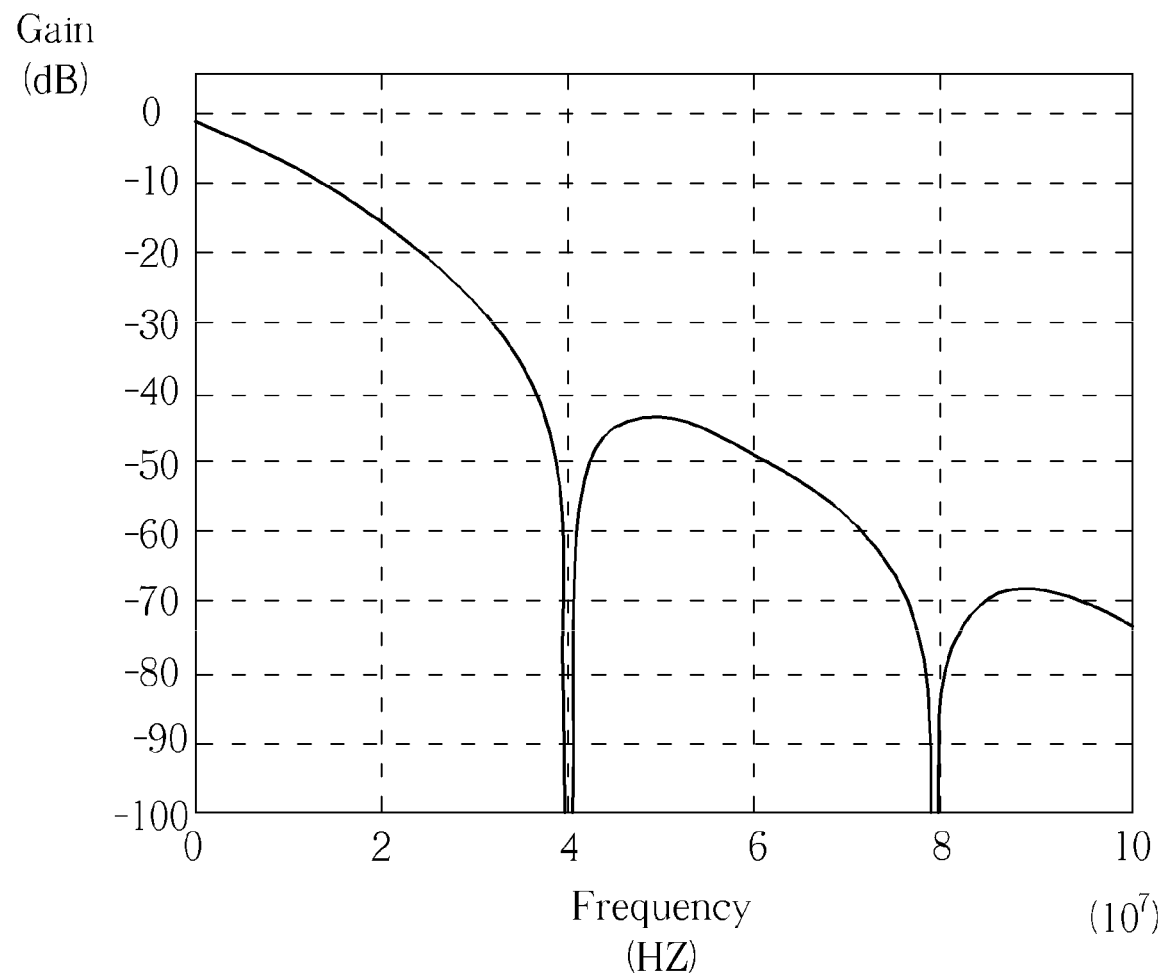
FIG. 1 is a diagram illustrating frequency responses of a conventional SDR filter.
Figure 2:
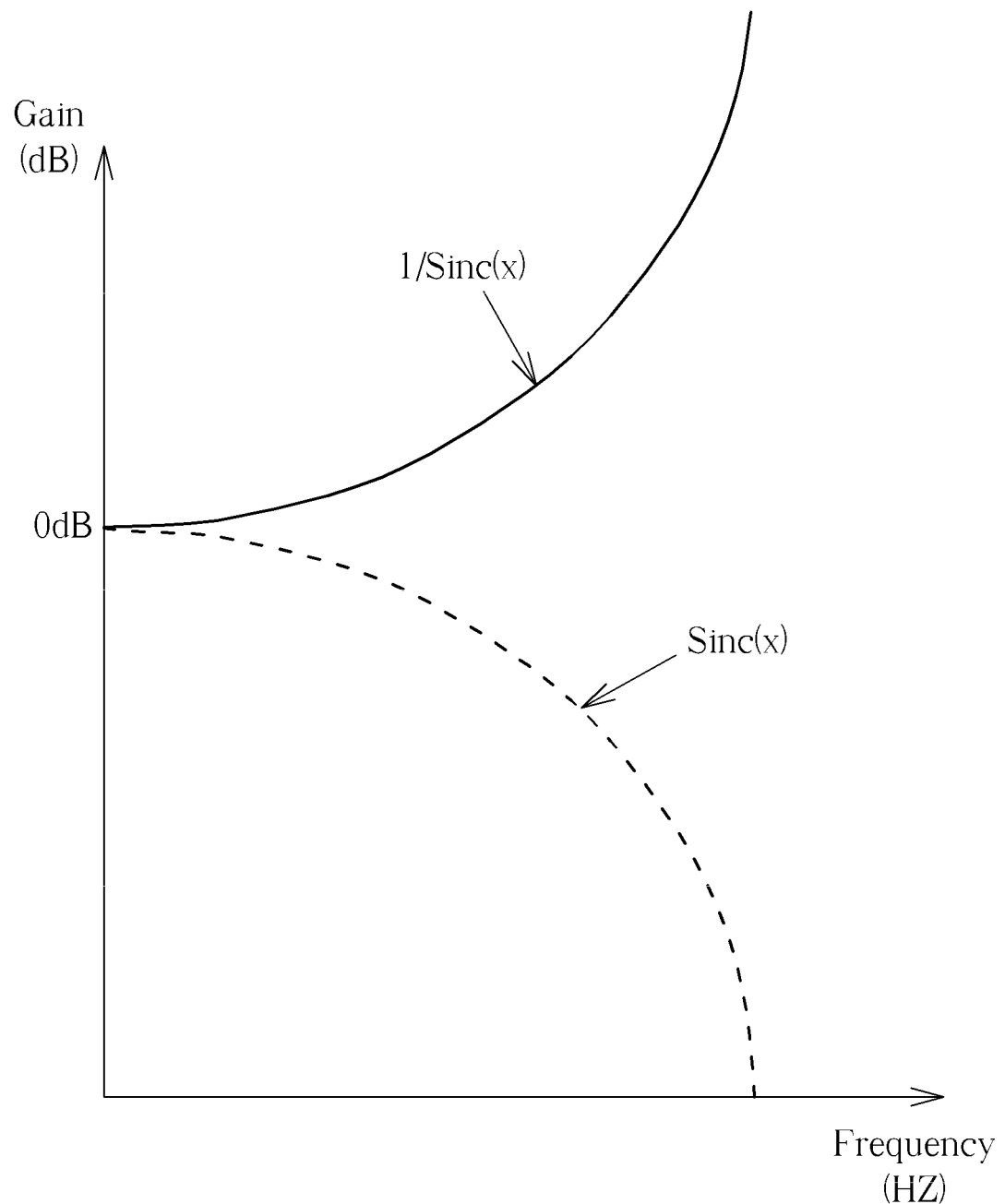
FIG. 2 is a diagram illustrating a total frequency response of combining a sin c filter and a 1/sin c filter.
Figure 3:
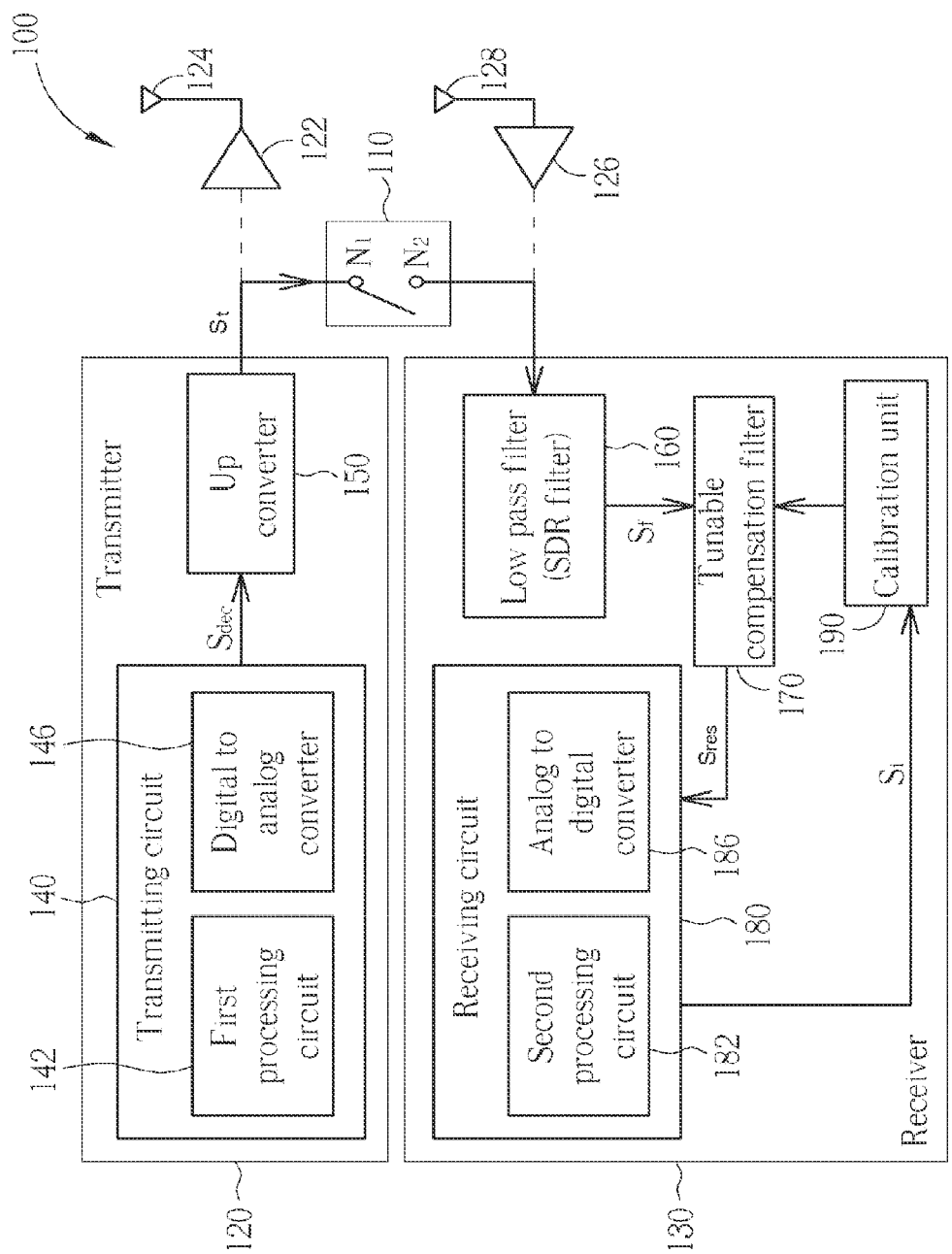
FIG. 3 is a block diagram illustrating a communication device according to a first embodiment of the present invention.
Figure 4:
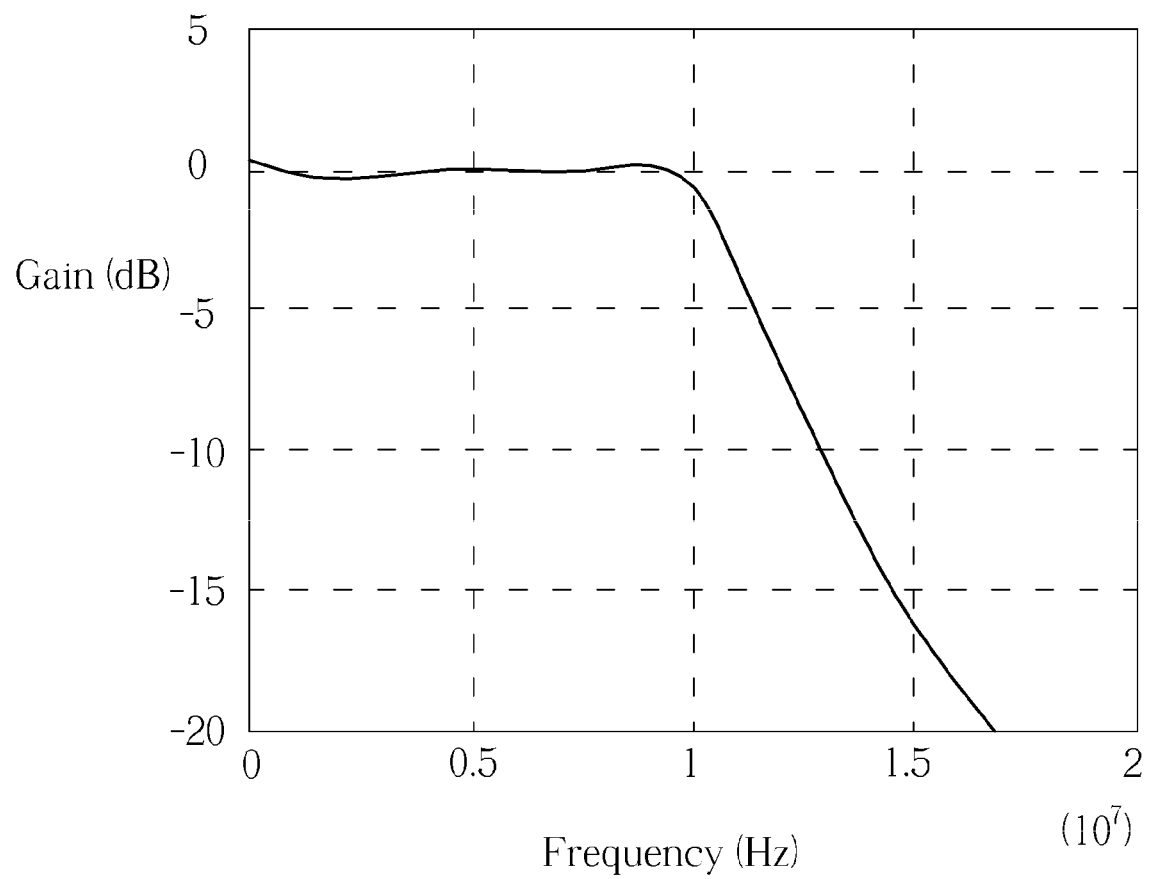

Please refer to FIG. 3. FIG. 3 is a block diagram illustrating a communication device 100 according to a first embodiment of the present invention. As shown in FIG. 3, the communication device 100 includes a loop switch 110, a transmitter 120, and a receiver 130. In this embodiment, the loop switch 110 is on (enabled/connected) for connecting the transmitter 120 with the receiver 130 to adjust coefficients of a tunable compensation filter 170 while the communication device 100 is under a test mode.

The loop switch 110 is disabled (disconnected) when the communication device 100 is under a normal mode. At the normal mode, an output signal of the transmitter 120 is transmitted via a power amplifier 122 and an antenna 124, and then received by the receiver 130 via an antenna 128 and a low noise amplifier 126.

As shown in FIG. 3, in this embodiment the transmitter 120 includes a transmitting circuit 140 and an up converter 150. The transmitting circuit 140 generates a detecting signal $S_{dec}$, which represents an original signal from the transmitter (Tx). The up converter 150 then up samples the detecting signal $S_{dec}$ to generate a transmitted signal $S_t$. In addition, in this embodiment the transmitting circuit 140 includes a first processing circuit 142 (i.e., as the transmitting end, Tx) and a digital to analog converter 146.

In this embodiment, the receiver 130 includes a low pass filter 160 as the SDR filter, a tunable compensation filter 170, a receiving circuit 180 and a calibration unit 190. When the communication device 100 is under the test mode, the low pass filter 160 receives the transmitted signal $S_t$ from the transmitter 120, and filters and down samples the transmitted signal St to thereby generate a filtered signal $S_f$. Since people in this art know the operation and structure of the SDR filter well, further description is omitted here for brevity.

As shown in FIG. 3, the tunable compensation filter 170 compensates the filtered signal $S_f$ to thereby generate a received signal $S_{res}$. The receiving circuit 180 includes an analog-to-digital converter 186 and a second processing circuit 182 (i.e., a receiving end, Rx). The receiving circuit 180 compares the $S_{res}$ detecting signal $S_{dec}$ in a digital format with the received signal $S_{rec}$ in a digital format to generate at least an indicating signal $S_i$.

Then, the calibration unit 190 adjusts at least a coefficient of the tunable compensation filter 170 according to the detecting signal $S_{dec}$. That is, the receiving circuit 180 adjusts the coefficient(s) of the tunable compensation filter 170 according to an inaccuracy degree (difference level) between the detecting signal $S_{dec}$ and the received signal $S_{rec}$.

In this manner, the communication device 100 adjusts the coefficients of the tunable compensation filter 170 when the frequency response of the SDR filter 160 varies to make the whole frequency response of the communication device 100 be a substantially flat curve.

It should be noted, however, that the above is not meant to be limitations of the present invention. In other embodiments of the present invention, the calibration unit 190 can compare a detecting signal $S_{dec}$ in an analog format (i.e., signal at Tx) with a received signal in an analog format (i.e., signal at Rx) for executing the calibration.

From the above description, the calibration method tests and calibrates at least a pole of the tunable compensation filter 170. That is, in one embodiment where the tunable compensation filter 170 has a plurality of pole pairs, the communication device 100 at this time will respectively compares and calibrates the signal on each of the pole pairs to hence adjust the coefficient(s) of the tunable compensation filter 170 when needed.

After the abovementioned operation (e.g. the calibrating operation), the gain response of the tunable compensation filter 170 is complementary to the gain response of the low pass filter 160 for compensating the low pass filter 160. In addition, the communication device 100 can execute the calibrating operation when the communication device 100 is powered on, and/or when the performance is downgraded, and/or dynamically execute the calibration operation according to the design requirement or depending on the user/the system.

From the description above, the calibration method tests and calibrates at least a pole of the tunable compensation filter 170. That is, in one embodiment where the tunable compensation filter 170 has a plurality of pole pairs, the communication device 100 at this time respectively compares and calibrates the signal on each of the pole pairs to hence adjust the coefficient(s) of the tunable compensation filter 170 when needed.

In a case where the tunable compensation filter 170 has N pole pairs, a calibrating loop (formed by the receiving circuit 140 and the receiving circuit 180 in FIG. 3) will have N sets of detecting signals $S_{dec}$ and N sets of received signals $S_{rec}$ corresponding to the N pole pairs of the tunable compensation filter 170 respectively.

Under the calibrating operation, each set of the detecting signals $S_{dec}$ and the received signals $S_{rec}$ are compared for calculating the signal inaccuracy between the signals and the coefficient corresponding to a respective set in a predetermined period number is adjusted. The magnitude of the period number for calibrating each pole pair varies according to the design requirements.

Furthermore, the coefficient keeps its original value and is determined regardless of adjustment when an error value between one set of the detecting signals $S_{dec}$ and the received signals $S_{rec}$ is smaller/equal to a predetermined threshold value. A coefficient of the tunable compensation filter 170 is adjusted when the error value corresponding to a pole pair of the tunable compensation filter 170 is larger than the predetermined threshold value.

Figure 5:
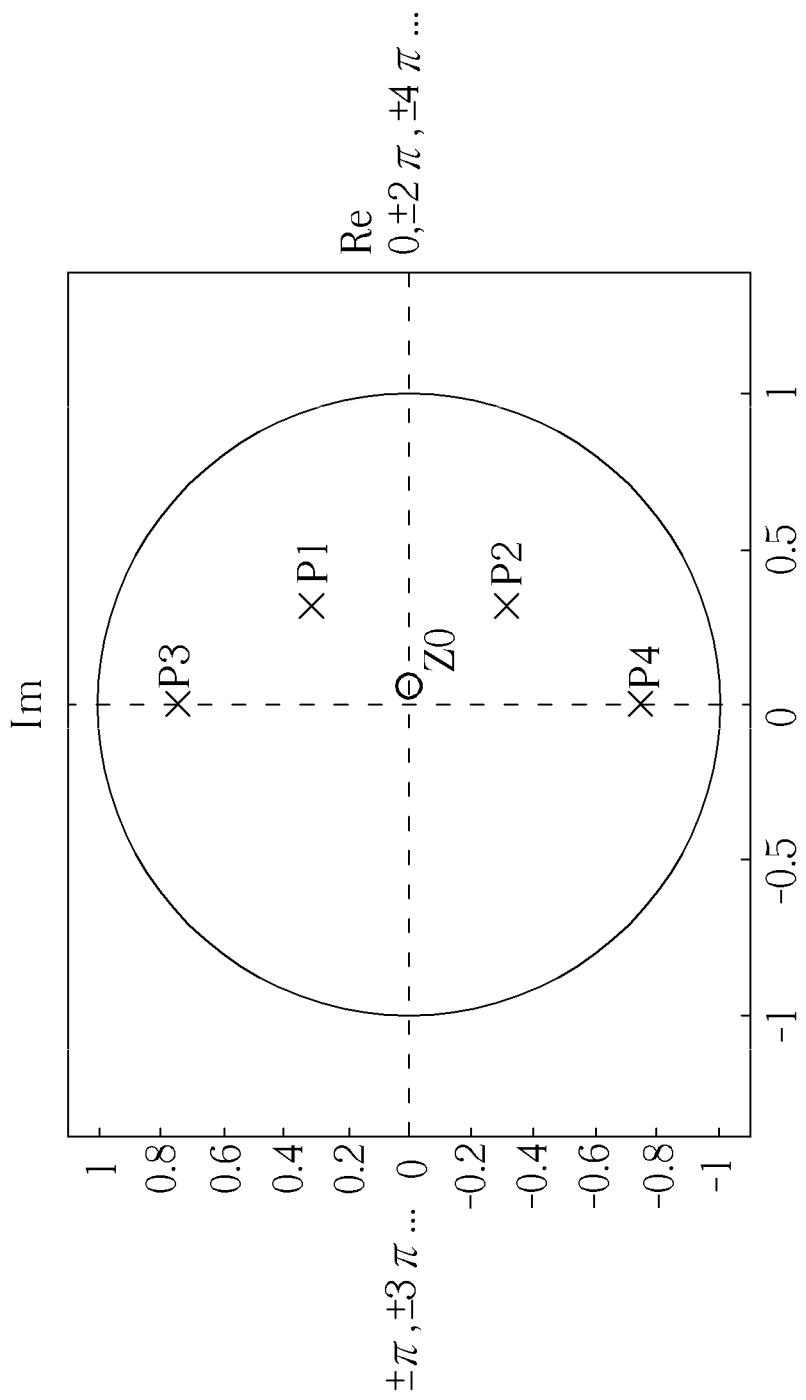
FIG. 5 is a Z-plane diagram of the tunable compensation filter according to an embodiment of the present invention.

Since the tunable compensation filter 170 compensates the low pass filter 160, the tunable compensation filter 170 has a high frequency gain. In an embodiment, the tunable compensation filter 170 has four poles (two pole pairs) and a zero. Please refer to FIG. 5. FIG. 5 is a Z-plane diagram of the tunable compensation filter 170 according to an embodiment of the present invention. Since the meaning of Z-plane and poles and zeros are known by people in this art, further description is omitted here for brevity.

As shown in FIG. 5, if there are a pole P1 at π/4 and a pole P3 at π/2 on the Z-plane, there must be a pole P2 at −π/4 and a pole P4 at −π/2 on the Z-plane. The pole P1 and the pole P2 form a first pole pair, while the pole P3 and the pole P4 form a second pole pair, and a zero Z0 on a real axis (FIG. 5).

Supposing that a distance between the first pole pair (P1, P2) and the origin is expressed as m and a distance between the second pole pair (P3, p4) and the origin is expressed as n, and a distance between zero Z0 and the origin is expressed as b0. An equation (1) of the tunable compensation filter 170 at this time can therefore be expressed as follows:

$$\frac{Y(z)}{X(x)} = \frac{(z-b0)}{\left(z-ne^{j\frac{\pi}{2}}\right)\left(z-ne^{-j\frac{\pi}{2}}\right)\left(z-me^{j\frac{\pi}{4}}\right)\left(z-me^{-j\frac{\pi}{4}}\right)} \quad (1)$$

$$= \frac{(z-b0)}{(z^2+n^2)(z^2-\sqrt{2}\,mz+m^2)}$$

$$= \frac{(z-b0)}{(z^4-\sqrt{2}\,mz^3+(m^2+n^2)z^2-\sqrt{2}\,mn^2z+m^2n^2)}$$

$$= \frac{z^{-3}-b0z^{-4}}{(1-\sqrt{2}\,mz^{-1}+(m^2+n^2)z^{-2}-\sqrt{2}\,mn^2z^{-3}+m^2n^2z^{-4})}$$

In this embodiment, the frequency response of the tunable compensation filter 170 is compensated by adjusting the magnitude of m and n. In this invention the distance between zero Z0 and the origin b0 can be any value except for 1. For instance, in an embodiment of the present invention, b0 is set as −0.07.

When an equation of the tunable compensation filter 170 in the frequency domain is expressed as equation (1), a corresponding equation in time domain of the tunable compensation filter 170 can be expressed as:

$$y(n)=w(1)y(n-1)+w(2)y(n-2)+w(3)y(n-3)+w(4)y(n-4)+x(n-3)-b0\times x(n-4) \quad (2)$$

Wherein $$W=[w(1)w(2)w(3)w(4)]=[\sqrt{2}m(m^2+n^2)\sqrt{2}mn^2m^2n^2] \quad (3)$$

Figure 6:
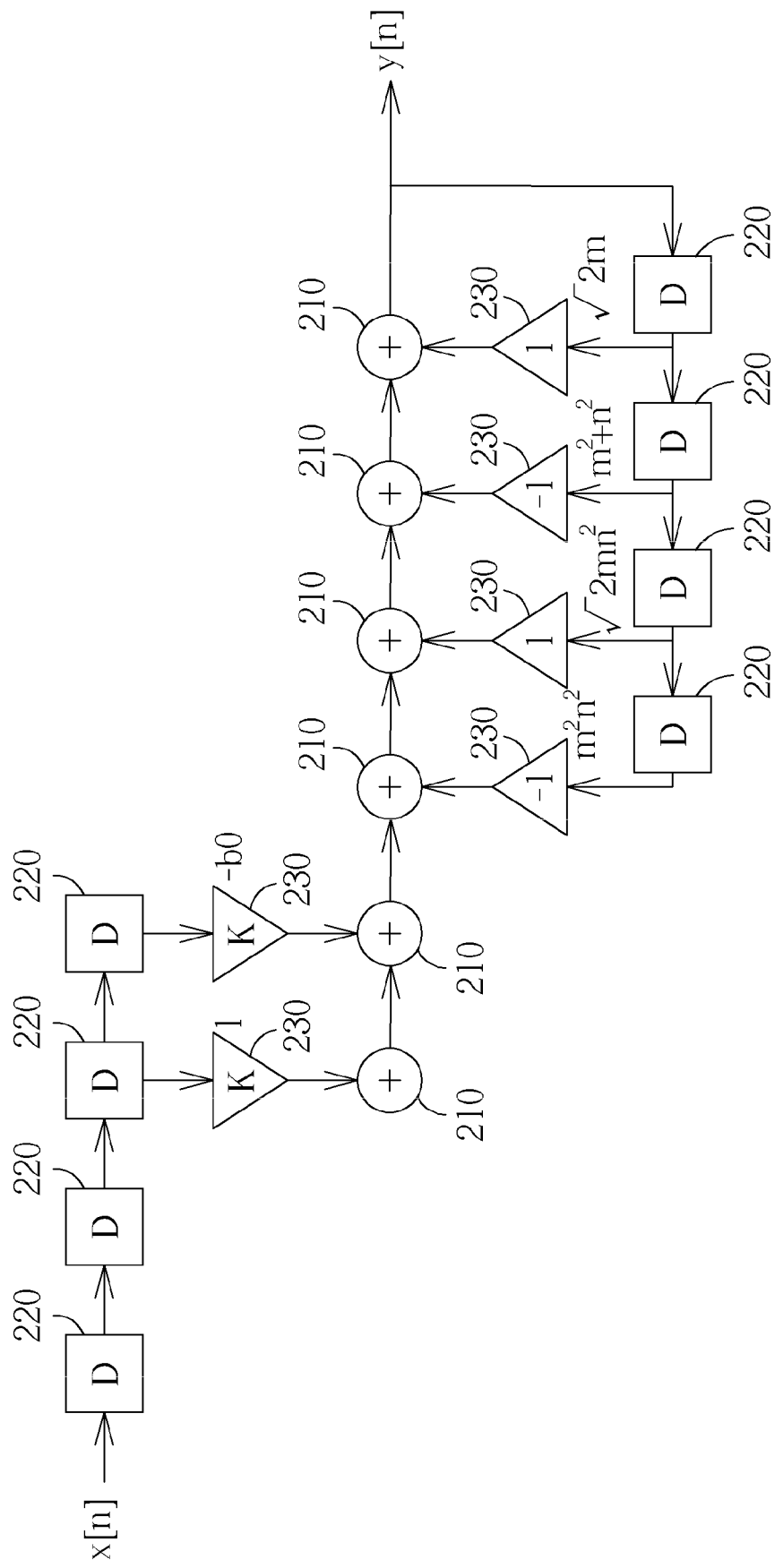
FIG. 6 is a block diagram illustrating a circuit structure of the tunable compensation filter established according to equation (1).

Please refer to FIG. 6. FIG. 6 is a block diagram illustrating a circuit structure of the tunable compensation filter 170 established according to the equation (1). In alternative designs, the circuit structure of the tunable compensation filter 170 differs depending on the equation (1). In FIG. 6, the circuit structure of the tunable compensation filter 170 includes a plurality of addition units 210, a plurality of delay units 220, and a plurality of multiplication units 230. Since the associated meaning of m, n and b0 have been detailed above; further description is omitted here for brevity.

As shown in FIG. 6, a coefficient K illustrated in the multiplication units 230 represents that, when necessary, a parallel shifting operation can be executed by multiplying K with the multiplication units 230 corresponding to x[n−3], and x[n−4] respectively.

Figure 7:
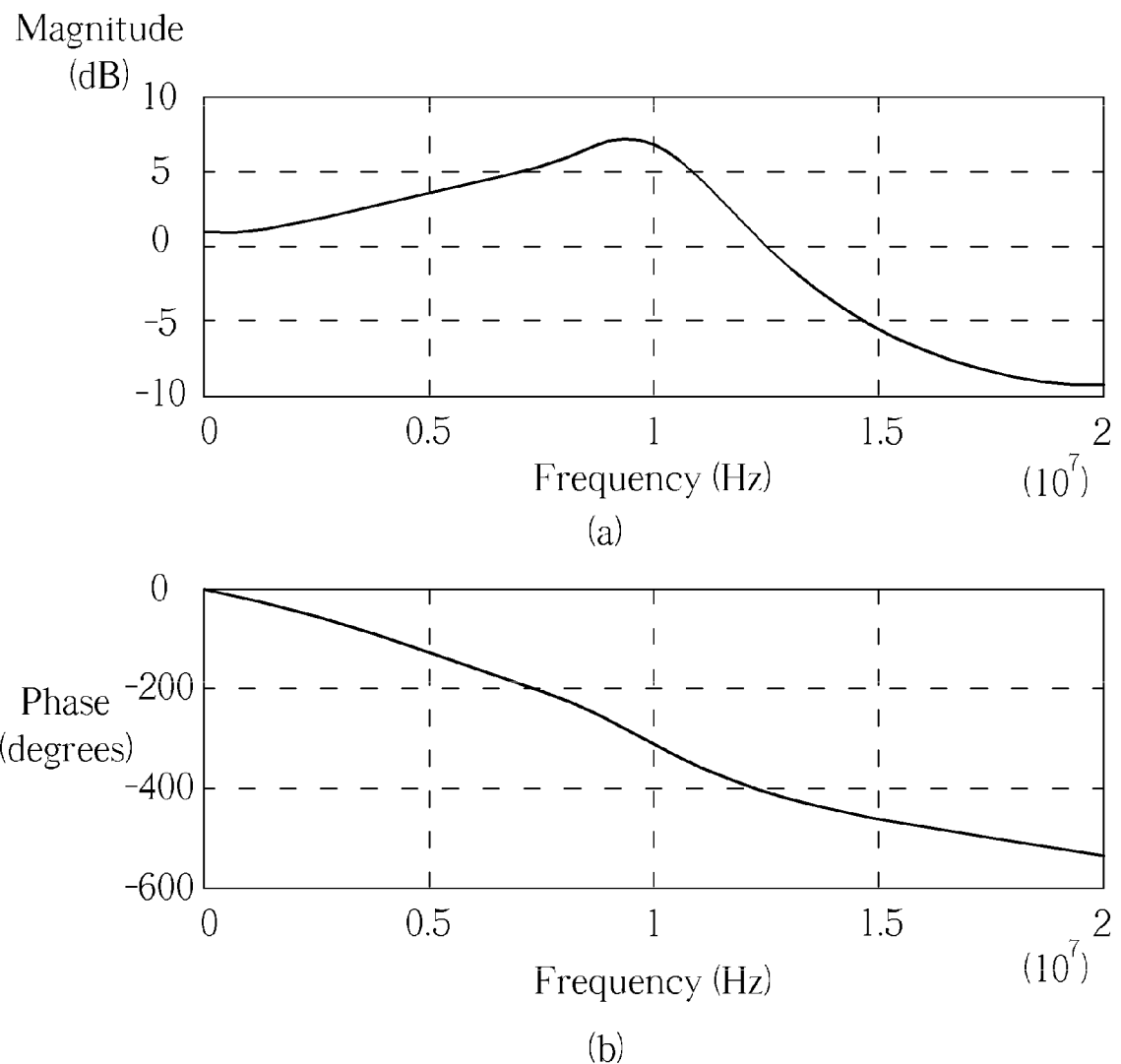
FIG. 7 is a curve diagram illustrating a frequency response and phase response of the tunable compensation filter according to the FIG. 5.

Please refer to FIG. 7. FIG. 7 is a curve diagram illustrating a frequency response and phase response of the tunable compensation filter 170 according to FIG. 6. As shown in FIG. 7, the magnitude of m is 0.51, and the magnitude of n is 0.73. As mentioned above, a frequency curve illustrated at f(a) has a vertical shift when multiplying K with the multiplication units 230 corresponding to x[n−3], and x[n−4] respectively.

Figure 8:
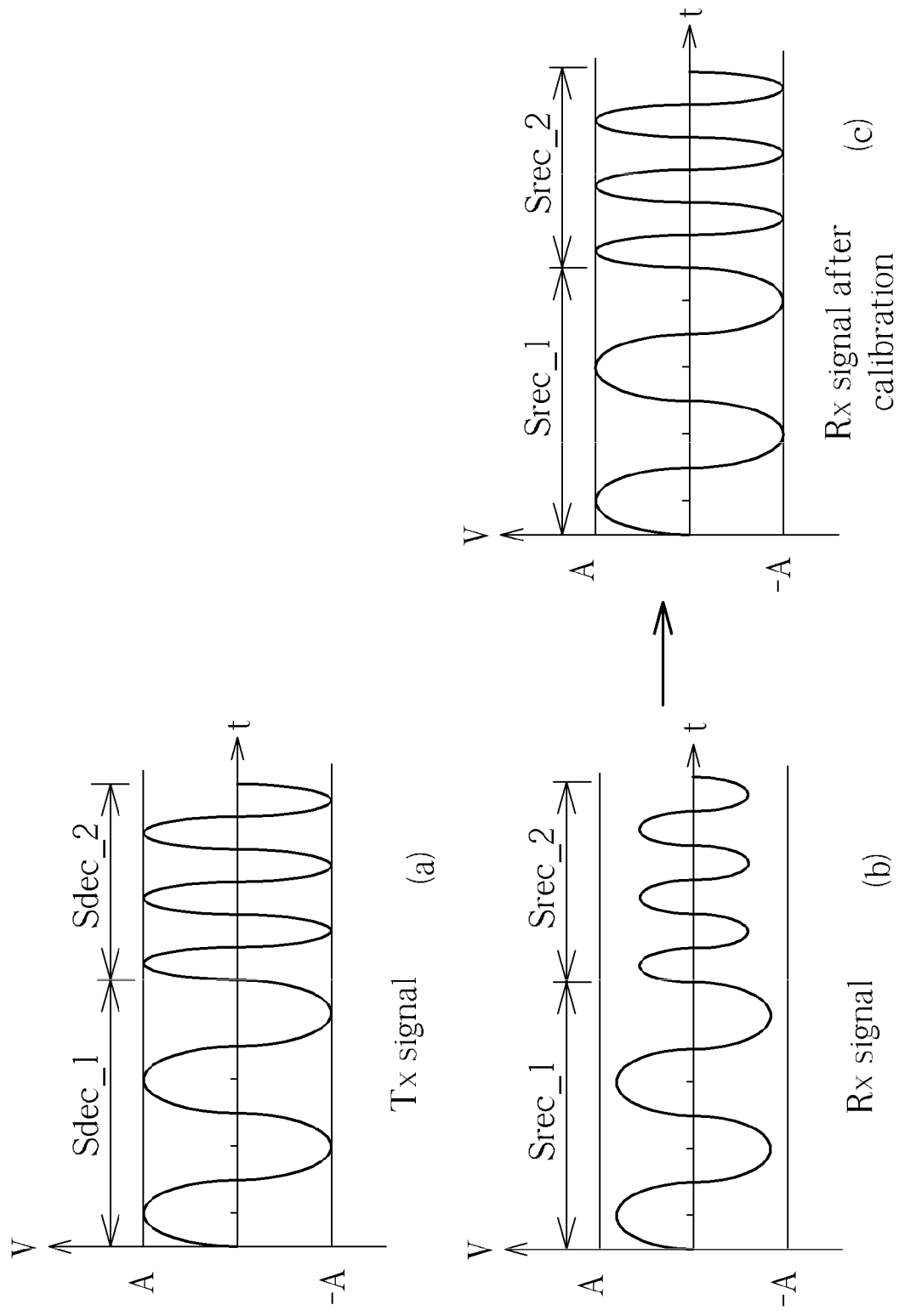
FIG. 8 is a diagram illustrating calibrating the received signal $S_{dec}$ from the receiver according to the detecting signals $S_{dec}$ from the transmitter.
Figure 9:
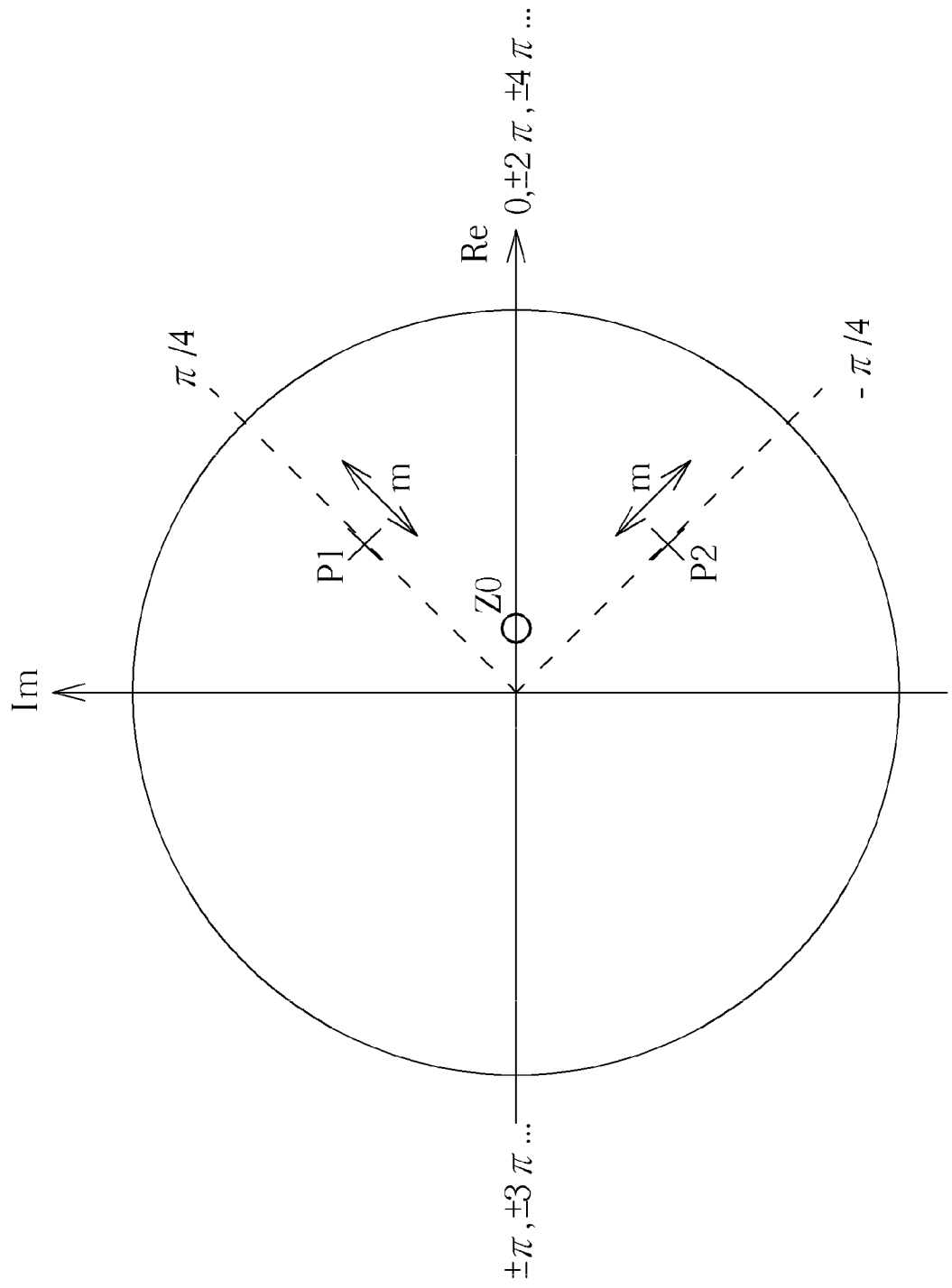
FIG. 9 is a diagram illustrating adjusting the coefficient m corresponding to the first pole pair on the Z-plane.
Figure 10:
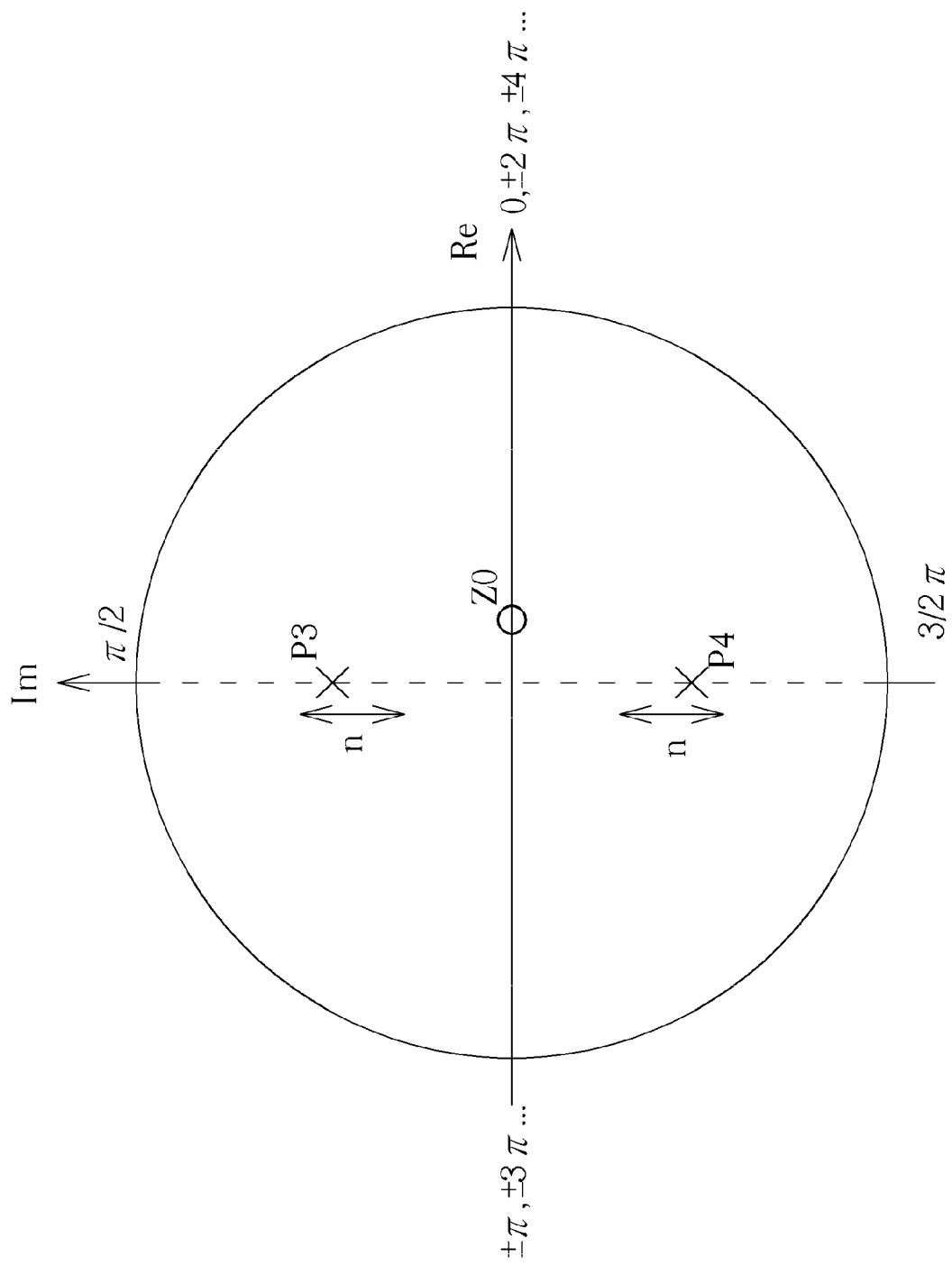
FIG. 10 is a diagram illustrating adjusting the coefficient n corresponding to the second pole pair on the Z-plane.

Please refer to FIG. 8, FIG. 9 and FIG. 10. FIG. 8 is a diagram illustrating executing calibrating operation upon the communication 100 according to the detecting signals $S_{dec}$ from the transmitter 120 and the received signals $S_{rec}$ from the receiver 130. FIG. 9 is a diagram illustrating adjusting the coefficient m corresponding to the first pole pair on the Z-plane. FIG. 10 is a diagram illustrating adjusting the coefficient n corresponding to the second pole pair on the Z-plane.

For instance, in one embodiment of the present invention, the magnitude of the period number for calibrating the first pole pair (P1, P2) is 2, and the magnitude of the period number for calibrating the second pole pair (P3, P4) is 3. When an amplitude of the received signals $S_{rec}$ and an amplitude of the detecting signals $S_{dec}$ are different and a corresponding error value is larger than a predetermined threshold range, the coefficient m corresponding to the first pole pair at this time will be adjusted.

Supposing that a sampling frequency of the communication device 100 is 40 MHz, the first processing circuit 142 within the transmitting circuit 140 at this time transmits a single tone signal having a frequency of π/4 (a separated signal, where every 8$^{th}$ sampled point forms a period) as the detecting signal $S_{dec\_1}$, the digital detecting signals $S_{dec\_1}$ express continuous signals with frequency 5 MHz.

That is, the loop circuit formed by the transmitter 120, the loop switch 110 and the receiver 180 transmits the detecting signals $S_{dec\_1}$ with frequency 5 MHz and receives the received signals $S_{rec\_1}$ with frequency 5 MHz.

In a case where the amplitude of the received signals $S_{rec\_1}$ is smaller than the amplitude of the detecting signals $S_{dec\_1}$ and the error value between the received signals $S_{rec\_1}$ and the detecting signals $S_{dec\_1}$ exceeds a predetermined threshold value, the communication device 100 at this time determines the coefficient m of the first pole pair needs to be adjusted and the calibration unit 190 controls the tunable compensation filter 170 to adjust the coefficient m. The distance between the first pole pair and the origin is modulated by adjusting the magnitude of the coefficient m. Therefore, after the calibrating operation to adjust the magnitude of the coefficient m corresponding to the tunable compensation filter 170, the amplitude of detecting signals $S_{dec}$ and the amplitude of the received signals $S_{rec}$ will be the same.

After calibrating the coefficient m of the first pole pair (P1, P2), the communication device then calibrates the coefficient of the second pole pair (P3, P4) of the tunable compensation filter 170. Similarly, for calibrating the second pole pair (P3, P4), the first processing circuit 142 within the transmitting circuit 140 at this time transmits a single tone signal having a frequency of π/2 (a separated signal, and every 4$^{th}$ sampled point forms a period). The detecting signals $S_{dec\_1}$ in a digital format express continuous signals with frequency of 10 MHz when the sampling rate of the communication device 100 is 40 MHz.

That is, when executing the calibrating operation corresponding to the second pole pairs, if the amplitude of the received signals $S_{rec}$ is different from the amplitude of the detecting signals $S_{rec}$, the calibration unit 190 generates indicating signals $S_i$ to the tunable compensation filter 170 for adjusting the coefficient n corresponding to the second pole pairs of the tunable compensation filter 170. Adjusting the magnitude of the coefficient n simultaneously means modulating the distance between the second pole pair and the origin.

Furthermore, in other embodiment, the tunable compensation filter 170 has N pole pairs, the communication device 100 will execute a calibrating operation N times to each pair of the pole pairs of the tunable compensation filter 170.

To determine whether or not to adjust the corresponding coefficient of the tunable compensation filter 170 by comparing the corresponding voltage magnitude of the detecting signal $S_{dec}$ with the voltage of the received signals $S_{rec}$. In an alternative design, any coefficients representing the signal magnitude can be used for comparing the signal unity between the transmitting end and the receiving end.

Since the operation of the communication device 100 has been disclosed above and is known by people in this art, further description is omitted here for brevity.

By adjusting the coefficients of the tunable compensation filter 170, the tunable compensation filter 170 can adjust the coefficient (e.g., m, n) to thereby change the frequency of the tunable compensation filter 170 for compensating the low pass filter 160 while the frequency response of the low pass filter 160 deviates owing to the ambient temperature and/or environmental conditions. In this manner, the whole frequency response of the communication device 100 continues to meet the design requirements.

In conclusion, because of the low circuit complexity, the communication device 100 has an improved performance and a low cost. In addition, by changing the sampling rate of the analog to digital converter 186, the communication device 100 can receive signals that comply with various specifications such as 802.11 1/b/g, GSM, Bluetooth, etc. The communication device 100 of the present invention is a flexible SDR communication device complying with various communication specifications that is able to simultaneously maintain good communication qualities.

In conclusion, because of the low circuit complexity, the communication device 100 has improved performance and a low cost. In addition, by changing the sampling rate of the analog to digital converter 186, the communication device 100 can receive signals that comply with various specifications such as 802.11 1/b/g, GSM, Bluetooth, etc. The communication device 100 of the present invention is a flexible SDR communication device complying with various communication specifications that is able to simultaneously maintain good communication qualities.

What is claimed is:

1. A communication device, comprising:
   a loop switch, being turned on under a test mode and turned off under a normal mode;
   a transmitter, coupled to a first end of the loop switch, comprising:
      a transmitting circuit, for generating at least a detecting signal; and
      an up converter, for converting the detecting signal to generate a transmitted signal; and
   a receiver, coupled to a second end of the loop switch, comprising:
      a low pass filter, for filtering the transmitted signal to generate a filtered signal;
      a tunable compensation filter, for compensating the filtered signal to generate a received signal;
      a receiving circuit, for comparing the detecting signal with the received signal to generate at least an indicating signal; and
      a calibration unit, for adjusting at least a coefficient of the tunable compensation filter according to the indicating signal, wherein the tunable compensation filter has a plurality of poles; the transmitting circuit generates a plurality of detecting signals according to the poles respectively; the receiving circuit compares a plurality of received signals respectively corresponding to the detecting signals with the detecting signals to generate a plurality of indicating signals; and the calibration unit adjusts corresponding coefficients of the tunable compensation filter respectively according to the indicating signals.

2. The communication device of claim 1,
   wherein the transmitting circuit comprises:
      a first processing circuit, for generating the detecting signal; and
      a digital-to-analog converter, coupled to the first processing circuit, for converting the detecting signal from a digital format into an analog format; and
   the receiving circuit comprises:
      an analog-to-digital converter, coupled to the tunable compensation filter, for converting the filtered signal from an analog format into a digital format; and
      a second processing circuit, coupled to the tunable compensation filter, for comparing the detecting signal with the received signal to generate the indicating signal.

3. The communication device of claim 2, wherein the communication device receives different kinds of communication signals by adjusting a sampling rate of the analog-to-digital converter.

4. The communication device of claim 1, wherein the plurality of detecting signals are a plurality of single tone signals respectively corresponding to frequencies of the poles.

5. The communication device of claim 1, wherein the communication device complies with a plurality of communication specifications.

6. The communication device of claim 5, wherein the communication device is a software defined radio (SDR) communication device.

7. A communication device, comprising:
   a loop switch, being turned on under a test mode and turned off under a normal mode:
   a transmitter, coupled to a first end of the loop switch, comprising:
      a transmitting circuit, for generating at least a detecting signal; and
      an up converter, for converting the detecting signal to generate a transmitted signal; and
   a receiver, coupled to a second end of the loop switch, comprising:
      a low pass filter, for filtering the transmitted signal to generate a filtered signal;
      a tunable compensation filter, for compensating the filtered signal to generate a received signal, wherein the transmitting circuit generates the at least a detecting signal according to at least one pole of the tunable compensation filter;
      a receiving circuit, for comparing the detecting signal with the received signal to generate at least an indicating signal; and
      a calibration unit, for adjusting at least a coefficient of the tunable compensation filter according to the indicating signal.

8. The communication device of claim 7, wherein the at least a detecting signal comprises a single tone signal.

9. The communication device of claim 7, wherein the at least a detecting signal comprises a first single tone signal having a frequency of $1/8$ of a sampling rate of the communication device, and a second single tone signal with a frequency of $1/4$ of the sampling rate of the communication device.

10. A method for adjusting a tunable compensation filter within a communication device, comprising:
   under a test mode, generating at least a detecting signal according to at least a pole of the tunable compensation filter;
   generating a transmitted signal according to the detecting signal;
   receiving the transmitted signal via a loop switch;
   generating a filtered signal by filtering the transmitted signal;
   generating a received signal by compensating the filtered signal;
   generating at least an indicating signal by comparing the detecting signal with the received signal; and
   determining whether or not to adjust at least a coefficient of the tunable compensation filter according to the indicating signal;

converting the filtered signal from an analog format into a digital format according to a sampling rate;

wherein the loop switch is turned off under a normal mode; and wherein under the normal mode, the communication device receives different kinds of communication signals by adjusting the sampling rate.

11. The method of claim 10, wherein the detecting signal is a single tone signal corresponding to the pole of the tunable compensation filter.

12. The method of claim 10, wherein the communication device complies with a plurality of communication specifications.

13. The method of claim 10, wherein the communication device is a software defined radio (SDR) communication device.

14. The method of claim 10, wherein the detecting signal comprises a single tone signal with a frequency of ⅛ of a sampling rate of the communication device, and a single tone signal with a frequency of ¼ of the sampling rate of the communication device.

* * * * *